(12) United States Patent
Albrigo

(10) Patent No.: US 7,243,677 B2
(45) Date of Patent: Jul. 17, 2007

(54) AIR EXCHANGE ASSEMBLY

(75) Inventor: Steven L. Albrigo, La Verne, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 428 days.

(21) Appl. No.: 10/734,284

(22) Filed: Dec. 15, 2003

(65) Prior Publication Data

US 2005/0126640 A1    Jun. 16, 2005

(51) Int. Cl.
*F16L 27/08*    (2006.01)
(52) U.S. Cl. .......................................... 137/580; 165/86
(58) Field of Classification Search ................ 137/580; 165/86, 89, 90, 91, 92, 154
See application file for complete search history.

(56) References Cited

U.S. PATENT DOCUMENTS

| | | | | |
|---|---|---|---|---|
| 2,308,137 A | * | 1/1943 | White | 137/580 |
| 3,599,127 A | * | 8/1971 | Krijger | 333/256 |
| 3,831,666 A | * | 8/1974 | Fleissner | 165/89 |
| 4,683,627 A | * | 8/1987 | Reinhold | 165/89 |
| 4,790,699 A | * | 12/1988 | Ringel | 137/580 |
| 6,753,822 B2 | * | 6/2004 | Tietjen | 343/757 |

* cited by examiner

*Primary Examiner*—John Rivell
(74) *Attorney, Agent, or Firm*—Baker Hostetler LLP

(57) ABSTRACT

An air exchange assembly that allows for the passage of large volumes of air through a continuously rotating joint. The large cross section of the passageways in the air exchange assembly allow for a large volume of low pressure air to pass through in both directions to make a closed loop air cooling system possible. The invention supports air flows of 10,000 standard cubic feet per minute (scfm) of air through two 20 inch diameter ducts through the rotating joint. The basic design can be scaled to allow for small ducting and lower air flow or larger ducting and higher airflow. The invention can also be scaled to provide for more channels of air flow.

20 Claims, 5 Drawing Sheets

AIR EXCHANGE ASSEMBLY

FIELD OF THE INVENTION

The present invention relates generally to air exchanges. More particularly, the present invention relates to air exchange assemblies.

BACKGROUND OF THE INVENTION

Liquid rotary joints provide single or multiple passages for liquid or air to be transported through a rotary joint. Liquid rotary joints do not allow for large volumes of air to pass through unless the air is under extremely high pressure. Liquid rotary joints typically provide for the passage of air only in one direction.

SUMMARY OF THE INVENTION

The present invention allows for the passage of large volumes of air through a continuously rotating joint. The large cross section of the passageways in the air exchange assembly of the present invention will allow for a large volume of low pressure air to pass through in both directions to make a closed loop air cooling system possible. The specific implementation of this invention supports air flows of 10,000 standard cubic feet per minute (scfm) of air through two 20 inch diameter ducts through the rotating joint. The basic design can be scaled to allow for small ducting and lower air flow or larger ducting and higher airflow. The invention can also be scaled to provide for more channels of air flow.

In accordance with one embodiment of the present invention, the air exchanger assembly includes a lower supply duct having a first lower supply duct end and a second lower supply duct end. The first lower supply duct end is connected to an external cooling unit. A bottom cap is attached to the second lower supply duct end and an upper supply elbow is mounted on a rotatable plate and connected to the bottom cap creating a first passage from the second lower supply duct end to the upper supply elbow through the bottom cap. An upper supply duct has a first upper supply duct end and a second upper supply duct end. The first upper supply duct end is connected to the upper supply elbow and the second upper supply duct end is connected to a device to be cooled. An upper return duct has a first upper return duct end and a second upper return duct end. The first upper return duct end is connected to the device to be cooled. An upper return plenum is connected to the rotatable plate and to the second upper return duct end. A second passage is connected to the upper return plenum. A lower return plenum is connected to the second passage creating a passage from the upper return plenum to the lower return plenum. A lower return duct has a first lower return duct end and a second lower return duct end. The first lower return duct end is connected to the lower return plenum. The second lower return duct end is connected to the external cooling unit.

The invention can further include a slip ring assembly forming part of the first passage.

In one embodiment of the invention the second passage is an annular passage.

The invention can further include an additional upper return duct and upper return plenum and a third passage for the additional upper return duct and upper return plenum.

The first passage in some embodiments of the invention is an annular passage.

In an alternate embodiment of the invention, a method for directing air flow through an air exchange assembly includes directing air flow from an external cooling unit through a lower supply duct to a bottom cap attached to the lower supply duct; directing air flow up through a first chamber connected to the bottom cap to an upper supply elbow mounted on a rotatable plate; directing air flow from the upper supply elbow through an upper supply duct to a device to be cooled; directing air flow from the device to be cooled to an upper return duct connected to an upper return plenum mounted on the rotatable plate; and directing air flow from the upper return plenum through a second chamber to a lower return plenum and through a lower return duct connected to the external cooling unit.

The first chamber in some embodiment of the invention includes a slip ring assembly forming part of the first chamber between the bottom cap and the upper supply elbow.

The second chamber in other embodiments of the invention is an annular passage.

The invention can further include directing air flow to an additional upper return duct and upper return plenum, and in some cases directing airflow through a third chamber to the additional upper return duct and upper return plenum.

The first chamber in alternate embodiments of the invention is an annular passage.

The invention in another embodiment is an air exchange assembly that includes a lower supply duct means for directing air flow from an external cooling unit to a bottom cap connected to the lower supply duct means. A first chamber means directs air flow from the lower supply duct means through the bottom cap to an upper supply elbow mounted on a rotatable plate. An upper supply duct means directs air flow from the upper supply elbow to a device to be cooled. An upper return duct means directs air flow from the device to be cooled to an upper return plenum mounted on the rotatable plate. A second chamber means directs air flow from the upper return plenum to a lower return plenum. A lower return duct means directs air flow from the lower return plenum to a lower return duct connected to the external cooling unit.

The first chamber means in one embodiment of the invention includes a slip ring assembly.

The second chamber means is an annular passage in other embodiments of the invention.

The invention in another embodiment further includes a third chamber means for directing air flow to an additional upper return duct and upper return plenum.

In some instances the first chamber means is an annular passage.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
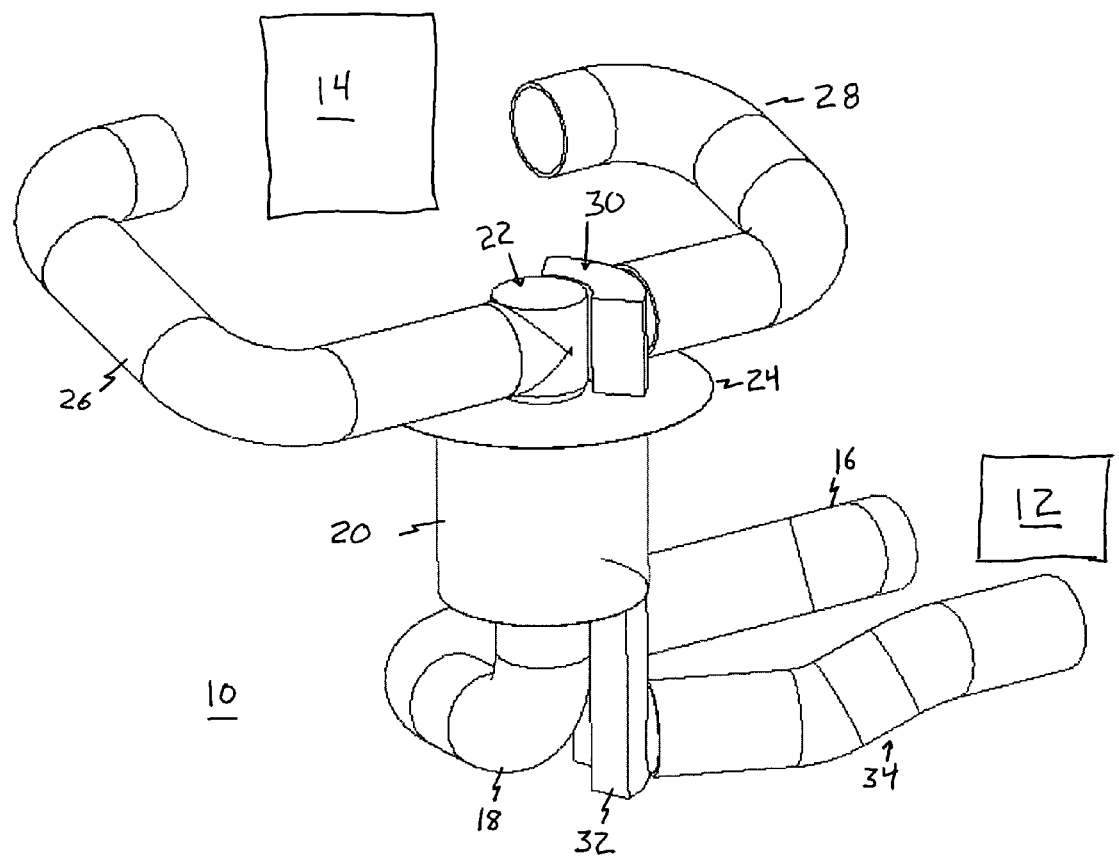
FIG. 1 is an illustration of an air exchange assembly.

The invention will now be described with reference to the drawing figures, in which, like reference numerals refer to like parts throughout. An embodiment in accordance with the present invention provides an air exchange assembly that allows for the passage of large volumes of air through a continuously rotating joint. The specific implementation provides support for air flows of 10,000 standard cubic feet per minute (scfm) through two 20 inch diameter ducts and a rotating joint. The basic design can be scaled to allow for small ducting and lower air flow or larger ducting and higher air flow. The invention can also be scaled to provide for more channels of air flow. Another advantage of the present invention is that a large cross section of the passageway in the air exchange assembly will allow for a large volume of low pressure air to pass through in both direction to make a closed loop air cooling system possible.

An embodiment of the present inventive apparatus is illustrated in FIG. 1. FIG. 1 is an illustration of an air exchange assembly 10. The air exchange assembly 10 can be connected to a cooling unit 12 (or any other type of environmental control unit) at one end and a device to be cooled 14 at another end. A lower supply duct 16, is connected to cooling unit 12. The cooling unit 12 supplies cool air through lower supply duct 16 to a air chamber bottom cap 18. The lower supply duct 16 and the air chamber bottom cap 18 are both fixed. The air chamber bottom cap 18 is connected to body 20 which creates a passage or chamber for airflow through the body to an upper supply elbow 22. The upper supply elbow 22 is mounted on a top plate 24 which rotates. The supply elbow 22 acts as the cold supply air outlet from the air exchange assembly. The upper supply elbow 22 rotates with top plate 24 and the upper portions of the radar pedestal. Upper supply duct 26 is connected to the upper supply elbow 22 and supplies cold air from the outlet of the air exchange assembly to the inlet of device 14 which could be, for example, an antenna.

An upper return duct 28 is connected to the device 14 to be cooled and provides an air passage for warm air from the device 14 to the air exchange assembly. The upper return duct 28 also rotates with the top plate 24 in the upper portion of the radar pedestal. Upper return plenum 30 is attached to the upper return duct 28 and acts as a warm return air entry to the body 20. The upper return plenum 30 rotates with the top plate 24 and the upper portion of the radar pedestal.

Top plate 24 caps off the top of the radar pedestal and provides a mounting point for the upper supply elbow 22, upper return plenum 30 and an inner body of the body 20. Top plate 24 also creates the top closeout and sealing surface for the body and rotates with the top portion of the radar pedestal. Body 20 is fixed to the base of the radar pedestal. The outer wall of body 20 creates an outer wall of an annular ring cavity for return air. The air coming into the top portion through the upper return plenum 30 pressurizes the cavity and the internal pressure forces the air to exit through a lower return plenum 32 through a lower return duct 34. The lower return plenum 32 is fixed and attaches to the bottom portion of the body 20 and caps off an annular ring cavity for warm return air and provides an air passage for warm return air to exit the air exchange assembly. The lower return duct 34 is fixed and provides an air passage to exit from the air exchange assembly to the entry of cooling unit/environmental control unit 12.

Figure 2:
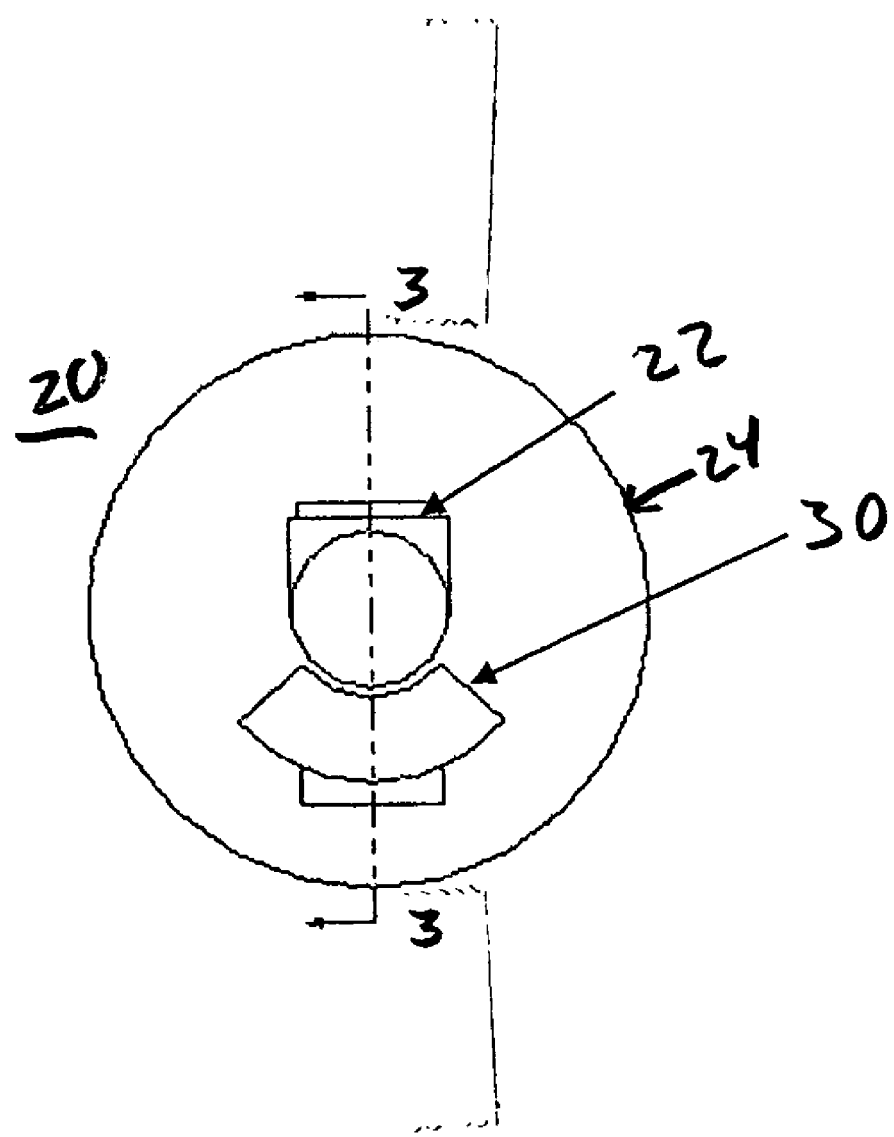
FIG. 2 is a top view of an air exchange assembly.

FIG. 2 is a top view of the body 20 of the air exchange assembly 10. The upper supply elbow 22 and the upper return plenum 30 are depicted in this figure along with the top plate 24.

Figure 3:
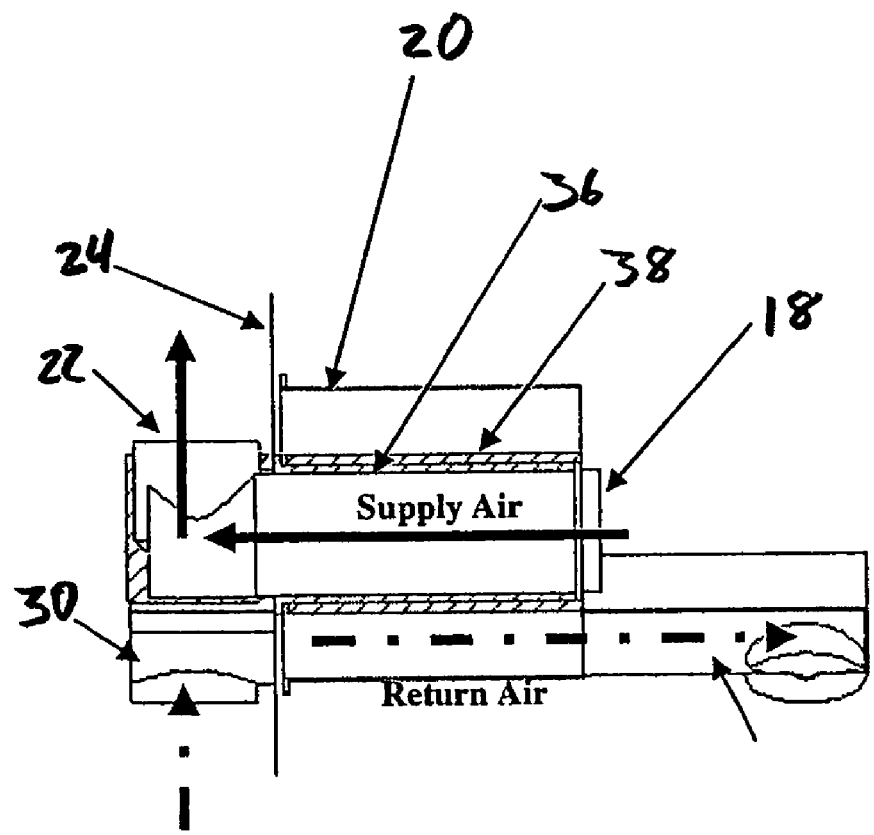
FIG. 3 is a cross-sectional view taken along line 3—3 in FIG. 2.

FIG. 3 is an illustration of a cut away of FIG. 2 along lines 3—3. Supply air enters outer drum 20 through bottom cap 18 to an air chamber/passageway. A slip ring assembly made up of an inner body 36 and an outer body 38 form a passage for the supply air to flow through body 20 to upper supply elbow 22.

The slip ring assembly is incorporated into the air exchange assembly to provide for the passage of electrical power and data through the rotating joint. Part of the function of the air exchange assembly is to provide cooling for the slip ring assembly which will allow for the passage of more electrical current with higher reliability. The upper supply elbow 22 interfaces with the top portion of this slip ring assembly and turns the cold supply air flow through a 90° angle to the upper supply duct 26. On the return side, the upper return plenum 30 and the slip ring assembly interbody 36 which can rotate are mounted on top plate 24.

The slip ring inner body 36 forms a portion of the duct passageway/chamber for the cold supply air. The passage of cold air through the inner body of the slip ring assembly cools the slip ring assembly to allow the slip ring assembly to operate more efficiently with higher reliability by minimizing localized heating due to current loses in the contact areas. The slip ring assembly outer body 38 creates the inner wall of the annular cavity for the return air.

Figure 4:
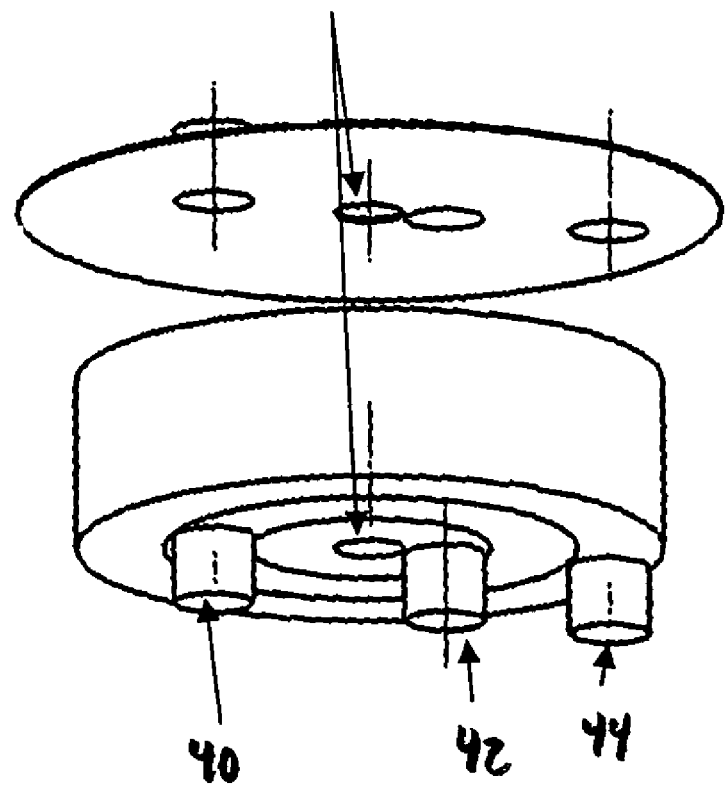
FIG. 4 is a bottom perspective view of an alternate embodiment of an air exchange assembly.
Figure 5:
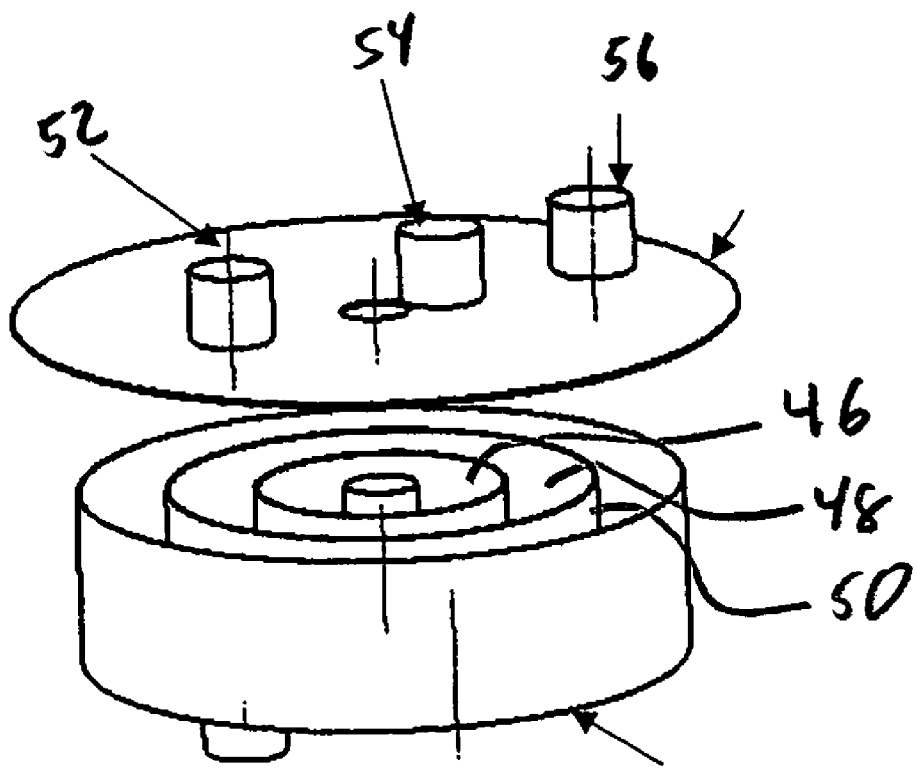
FIG. 5 is a top perspective view of an alternate embodiment of an air exchange assembly.

FIG. 4 is an alternate embodiment of the invention which leaves the center of the air exchange assembly as an open cylindrical passage and allows for a rotary coupler and slip ring assembly to be installed in that volume. In this alternate embodiment of the invention, three lower manifolds 40, 42, and 44 are provided which correspond to annular passageways/chambers 48 and 50 as depicted in FIG. 5. The air exchange assembly in this alternate embodiment also includes upper manifolds 52, 54 and 56, which correspond to the lower manifolds 40, 42, and 44, and passageways 48, 46 and 50, respectively.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An air exchange assembly comprising:
    a lower supply duct having a first lower supply duct end and a second lower supply duct end, said first lower supply duct end connected to an external cooling unit;
    a bottom cap attached to said second lower supply duct end at a first end and attached to one end of a body at a second end;
    an upper supply elbow mounted on a rotatable plate at another end of the body and communicatively connected to said bottom cap through a rotatable assembly extending through the body to the end of the body adjacent the second end of the bottom cap creating a first passage for air flow for a device to be cooled from said second lower supply duct end to said upper supply elbow through said bottom cap, wherein the rotatable plate is attached to the rotatable assembly;

an upper supply duct having a first upper supply duct end and a second upper supply duct end, said first upper supply duct end connected to said upper supply elbow and said second upper supply duct end connected to the device to be cooled;

an upper return duct having a first upper return duct end and a second upper return duct end, said first upper return duct end connected to the device;

an upper return plenum connected to said rotatable plate and connected to said second upper return duct end;

a second passage connected to said upper return plenum;

a lower return plenum connected to said second passage creating a passage from said upper return plenum to said lower return plenum; and a lower return duct having a first lower return duct end and a second lower return duct end, said first lower return duct end connected to said lower return plenum and said second lower return duct end connected to the external cooling unit.

2. The air exchange assembly as recited in claim 1 further comprising a slip ring assembly forming the rotatable assembly and a part of said first passage.

3. The air exchange assembly as recited in claim 2 wherein said slip ring assembly comprises a rotatable inner body and an outer body.

4. The air exchange assembly as recited in claim 1 wherein said second passage is an annular passage.

5. The air exchange assembly as recited in claim 1 further comprising an additional upper return duct and upper return plenum.

6. The air exchange assembly as recited in claim 5 further comprising a third passage for said additional upper return duct and upper return plenum.

7. The air exchange assembly as recited in claim 1 wherein said first passage is an annular passage.

8. A method for directing air flow through an air exchange assembly, the method comprising:

directing air flow from an external cooling unit through a lower supply duct to a bottom cap attached to the lower supply duct;

directing the air flow up through a first chamber connected to the bottom cap to an upper supply elbow mounted on a rotatable plate, the first chamber being formed at least in part by a rotatable assembly extending between and communicatively connecting the upper supply elbow to the bottom cap, with the rotatable assembly connected at one end to the rotatable plate and extending through the first chamber to an end of the first chamber adjacent the bottom cap;

directing the air flow from the upper supply elbow through an upper supply duct to a device to be cooled;

directing the air flow from the device to be cooled to an upper return duct connected to an upper return plenum that is mounted on the rotatable; and directing the air flow from the upper return plenum through a second chamber to a lower return plenum and through a lower return duct connected to the external cooling unit.

9. The method as recited in claim 8 wherein the rotatable assembly comprises a slip ring assembly forming part of the first chamber between the bottom cap and the upper supply elbow.

10. The method as recited in claim 9 wherein the slip ring assembly comprises a rotatable inner body and an outer body.

11. The method as recited in claim 8 wherein the second chamber is an annular passage.

12. The method as recited in claim 8 further comprising directing the air flow to an additional upper return duct and upper return plenum.

13. The method as recited in claim 12 further comprising directing the airflow through a third chamber to the additional upper return duct and upper return plenum.

14. The method as recited in claim 8 wherein the first chamber is an annular passage.

15. An air exchange assembly comprising:

a lower supply duct means for directing air flow from an external cooling unit to a bottom cap connected to said lower supply duct means at a first end and attached to one end of a body at a second end;

a first chamber means for directing the air flow from said lower supply duct means through the bottom cap to an upper supply elbow mounted on a rotatable plate, the first chamber means being formed at least in part by a rotatable assembly extending between and communicatively connecting the upper supply elbow to the bottom cap, with the rotatable assembly connected to the rotatable plate, wherein the rotatable plate is attached to another end of the body and the rotatable assembly extends through the body to the end of the body adjacent the second end of the bottom cap;

an upper supply duct means for directing the air flow from the upper supply elbow to a device to be cooled;

an upper return duct means for directing the air flow from the device to be cooled to an upper return plenum that is mounted on the rotatable plate;

a second chamber means for directing the air flow from the upper return plenum to a lower return plenum; and a lower return duct means for directing the air flow from the lower return plenum to a lower return duct connected to the external cooling unit.

16. The air exchange assembly as recited in claim 15 wherein said rotatable assembly comprises a slip ring assembly.

17. The air exchange assembly as recited in claim 16 wherein said slip ring assembly comprises a rotatable inner body and an outer body.

18. The air exchange assembly as recited in claim 15 wherein said second chamber means is an annular passage.

19. The air exchange assembly as recited in claim 15 further comprising a third chamber means for directing the air flow to an additional upper return duct and upper return plenum.

20. The air exchange assembly as recited in claim 15 wherein the first chamber means is an annular passage.

* * * * *

UNITED STATES PATENT AND TRADEMARK OFFICE
CERTIFICATE OF CORRECTION

| | | |
|---|---|---|
| PATENT NO. | : 7,243,677 B2 | Page 1 of 1 |
| APPLICATION NO. | : 10/734284 | |
| DATED | : July 17, 2007 | |
| INVENTOR(S) | : Steven L. Albrigo | |

It is certified that error appears in the above-identified patent and that said Letters Patent is hereby corrected as shown below:

<u>Column 5</u>
Line 61, after "rotatable" please insert --plate--.

Signed and Sealed this

Sixteenth Day of October, 2007

JON W. DUDAS
*Director of the United States Patent and Trademark Office*